United States Patent [19]

Kortschinski et al.

[11] Patent Number: 4,685,021
[45] Date of Patent: Aug. 4, 1987

[54] FAULT CURRENT DIVERTER

[76] Inventors: Juri Kortschinski, 1414 Lochlin Trail, Mississauga, Ontario, Canada, L5G 3V3; John D. Mintz, 176 Horsham Avenue, North York, Ontario, Canada, M2N 2A5; Reinhard Filter, 14 Charles Street, Georgetown, Ontario, Canada, L7G 2Z2

[21] Appl. No.: 841,452

[22] Filed: Mar. 20, 1986

[51] Int. Cl.$^4$ ............................................... H02H 7/26
[52] U.S. Cl. ..................................... 361/42; 174/55; 361/1; 361/55; 361/115; 361/117
[58] Field of Search ...................... 361/1, 2, 42, 54, 55, 361/93, 115, 117, 118; 174/55 G

[56] References Cited

U.S. PATENT DOCUMENTS

| | | | |
|---|---|---|---|
| 2,929,892 | 3/1960 | Blomgren | 200/61.08 |
| 3,238,321 | 3/1966 | Lawwill et al. | 200/61.08 |
| 3,660,720 | 5/1972 | Samm et al. | 361/57 |
| 3,962,605 | 6/1976 | Thaler | 361/54 |
| 4,441,134 | 4/1984 | Lewiner et al. | 361/45 |

Primary Examiner—A. D. Pellinen
Assistant Examiner—Jeffrey A. Gaffin
Attorney, Agent, or Firm—Ridout & Maybee

[57] ABSTRACT

A fault current diverter for use with high voltage electrical equipment is operative to divert fault current to ground by establishing a non-arcing low impedance current path to ground. The diverter includes a switching device having a moving contact which, in response to the triggering of a chemical propellant charge, is rapidly driven so as to pierce solid insulation and make contact with a high voltage conductor or terminal thereby to establish the non-arcing low impedance path.

19 Claims, 11 Drawing Figures

FAULT CURRENT DIVERTER

This invention relates to high speed fault current diverters for use in association with high voltage electrical equipment. The invention is especially applicable to a device for protecting against hazardous failures of underground distribution equipment.

There is an important need for a device which will reliably protect electrical apparatus in power distribution systems from violent failures, especially short-circuit failures. At the present time fuses and/or circuit breakers are used for the purpose, but they have serious shortcomings. Circuit breakers are too slow-acting to prevent excessive violence in cases of equipment failures. Fuses are often also too slow-acting, especially for modern distribution systems in which the short-circuit currents may be very high, and their operation is itself violent. Current-limiting fuses, although effective in some applications, are difficult to install in certain types of apparatus such as pad-mounted transformers, without creating new hazards.

The present invention provides a device which is free from the shortcomings mentioned above, and which will effectively prevent violent distribution equipment failure in any applications where violent failures would otherwise be likely to occur as a result of short-circuit faults.

The devices of the present invention operate on a different principle from the devices commonly accepted in the art. Instead of interrupting the fault current, they rapidly divert the current away from the failed apparatus by creating a non-arcing low impedance current path to ground.

According to one aspect of the present invention, a high speed fault current diverter apparatus used in connection with with high voltage electrical equipment including a high voltage conductor encapsulated in solid insulation, comprises: a metal body having a forward end and a rearward end, said metal body providing an internal cylindrical first chamber with an opening at its forward end comminicating with said first chamber and arranged coaxially therewith, conductor means for grounding said metal body, a metallic piston mounted within said first chamber for axial movement therealong, said piston having a forwardly and axially extending spike aligned with said opening, the metal body further providing an internal second chamber rearwardly of the first chamber and communicating therewith rearwardly of the piston, a chemical propellant charge in said second chamber, means for fastening the metal body to the equipment with said opening adjacent to the solid insulation of the conductor, and fault current responsive means for igniting the chemical propellant charge so as to propel the piston forwardly, thereby causing the spike to pierce the insultion of the conductor and so establish a non-arcing low impedance current path from the conductor to ground.

According to another aspect of the present invention, a high speed fault current diverter apparatus for use with high voltage electrical equipment including a high voltage terminal mounted on a conventional bushing well, comprises: an insulative body having a forward end and a rearward end, the body having a forwardly extending adaptor portion engageable with the bushing well to interface therewith, said body providing first and second internal, longitudinally aligned chambers separated from one another by a layer of penetrable solid insulation material, the first chamber being positioned rearwardly of the second chamber, a first conductor located in said first chamber, the first conductor defining a longitudinally extending cylinder having an axial opening at its forward end, a metallic piston mounted in the cylinder for axial movement therealong, said piston having a forwardly and axially extending pin aligned with said opening, a second conductor located in said second chamber, said second conductor providing contact means aligned with the pin, said first and second conductors providing, respectively, first and second external terminals, said second external terminal extending through the adaptor portion and being engageable with the high voltage terminal of the equipment, conductor means connected to the first external terminal for grounding the first conductor, a chemical propellant charge located in the cylinder rearwardly of the metallic piston, and fault current responsive means for igniting the propellant charge so as to propel the piston forwardly, thereby causing the pin to pierce the said layer of penetrable solid insulation and so establish a non-arcing low impedance current path from the high voltage terminal to ground via the first and second conductors and said conductor means.

The invention will now be described in greater detail with reference to the accompanying drawings which illustrate, by way of example, several embodiments of the invention. In the drawings.

Figure 1:
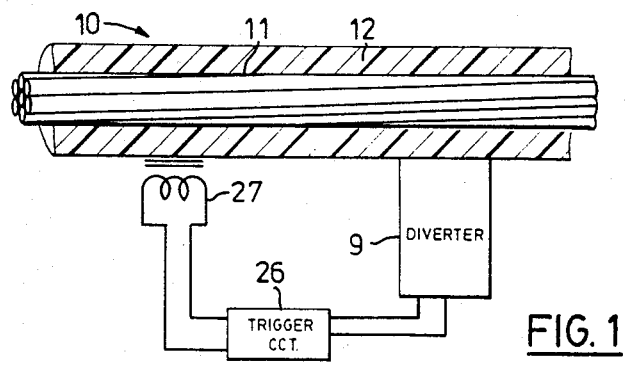
FIGS. 1 is a schematic block diagram showing a fault current diverter in association with a cable and a triggering circuit.
Figure 2:
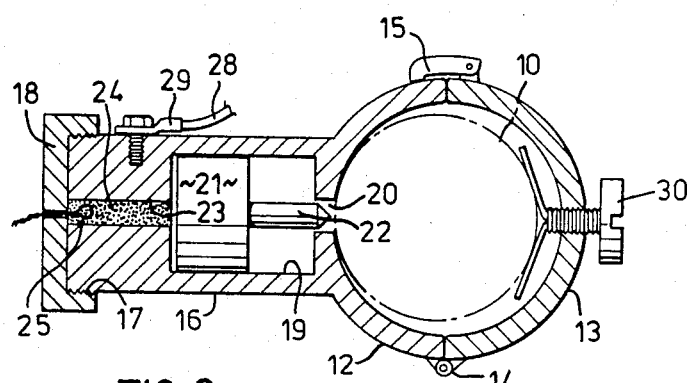
FIG. 2 is a plan view, partly in section, of a fault current diverter for use in association with a high voltage power cable.

Referring to FIGS. 1 and 2, the fault current diverter 9 is adapted for use with a high voltage power cable, represented schematically at 10, the cable having an inner conductor 11 encapsulated in solid insulation. In practice the cable 10 may incorporate a jacket, neutral and shield, but these are omitted from the drawings for simplicity. The fault current diverter incorporates a clamp by which it is fastened to the cable. The clamp is in the form of a split retaining ring comprising a first hemicylindrical clamping member 12 and a second hemicylindrical clamping member 13 hinged to one end thereof by a hinge 14. The clamping members 12 and 13 are fastened together in cooperative clamping relationship by a releasable locking means 15.

The diverter has a cylindrical metal body 16, the clamping member 12 being formed integrally with the forward end of the body or otherwise rigidly joined to it. The rearward end of the body 16 has a threaded portion 17 to which an end cap 18 is mounted.

The body 16 provides an internal cylindrical chamber 19 with an axial opening 20 at its forward end, the opening 20 communicating with the chamber 19. Within the chamber 19 is mounted a metallic piston 21 which is axially movable along the chamber. The piston 21 has an axially extending spike or piercing member 22 at its forward end; this spike is aligned with the opening 20 and can pass through it when the piston is propelled forwardly as hereinafter described. The body 16 further provides a second internal cylindrical chamber 23 which communicates with the chamber 19 rearwardly of the piston 21. The chamber 23 is arranged coaxially with the chamber 19 and the opening 20.

A propellant in the form of a chemical charge capsule 24 is located in the chamber 23 and this is ignited in response to a fault current by means of an electrically operated trigger wire 25 connected to a triggering circuit 26. The triggering circuit 26 receives the triggering signal from a current transformer 27 coupled to the cable 10.

The body 16 of the fault current diverter is grounded by a ground conductor 28 connected to the body by a terminal 29. In operatin the cable 10 is clamped between the clamping members 12, 13, the member 13 carrying an adjustable clamping device 30 positioned diametrically opposite the opening 20 for clamping the cable against the clamping member 12 with the opening 20, and therefore the spike 22, positioned against the cable insulation. In the event of a short-circuit fault current in the cable, the resultant surge energizes the current transformer 27 thereby activating the triggering circuit 26 and so igniting the chemical propellant charge 24. In this case the piston 22 is propelled rapidly forwardly, driving the spike 22 through the insulation 12 into contact with the conductor 11. In this way a non-arcing low impedance current path is established from the conductor 11 to ground via the spike 22, piston 21, diverter body 16 and ground conductor 28.

Figure 3:
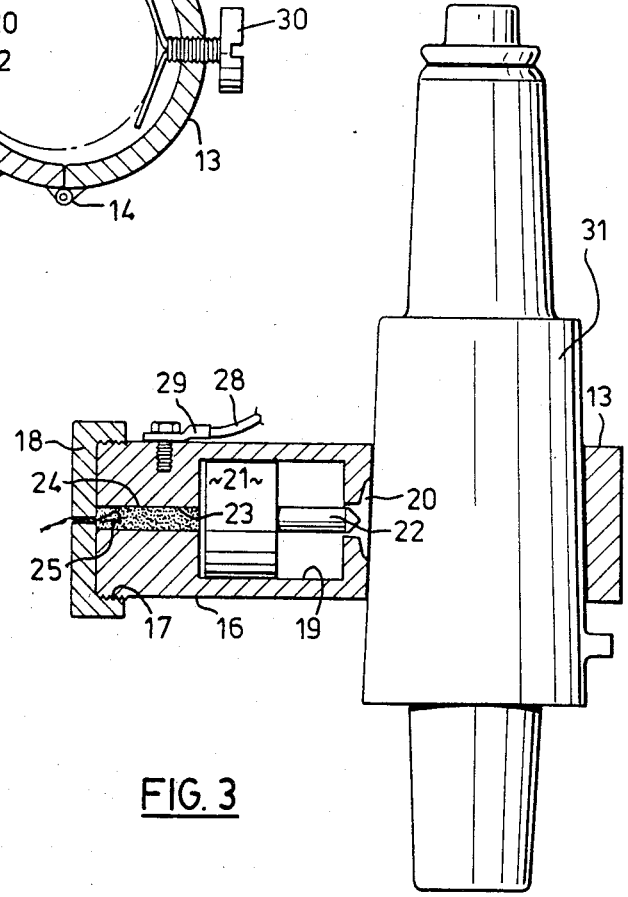
FIG. 3 is a side elevational view, partly in section, of a fault current diverter mounted on a terminal bushing of a distribution transformer.

The fault current diverter shown in FIG. 3 is essentially the same as that of FIG. 2 and the same reference numerals are used to denote corresponding parts. In this case, however, the clamping members 12, 13 are modified to receive the bushing 31 of the transformer terminal on which the diverter is mounted.

Figure 4:
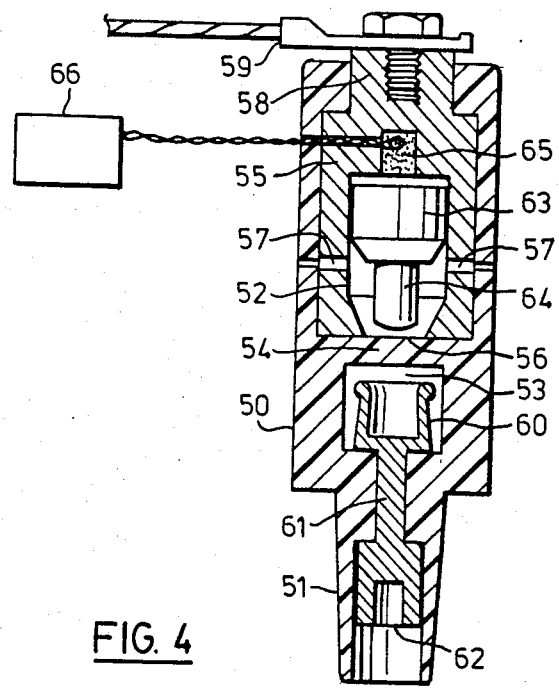
FIG. 4 shows in section an alternative fault current diverter according to the invention.

Referring now to FIG. 4, an alternative fault current diverter in accordance with the invention is shown. This diverter comprises a body of insulation material 50 which is generally cylindrical and at its forward end (i.e., the lower end as shown in FIG. 4) is formed with a forwardly extending adaptor portion 51 which is engageable with a transformer bushing well so as to interface with it. A first internal cylindrical chamber 52 and a second internal cyclindrical chamber 53 formed in the body 50 are separated from one another by a layer 54 of the solid insulation material. These chambers are longitudinally aligned, the chamber 52 being positioned rearwardly of the chamber 53.

Located in the chamber 52 is a conductive body 55 which defines a longitudinally extending cylinder, the cylinder having an axial opening 56 at its forward end and radial ports 57. One end of the conductive body 55 projects from the diverter body 50 forming an external terminal 58 to which a ground conductor 59 is connected.

Located in the chamber 53 is a tulip contact 60 having a stem 61 which extends through the adaptor portion 51 and terminates in an external terminal 62. The terminal 62 is adapted to engage the respective high voltage terminal of the bushing well in the distribution transformer.

A metallic piston 63 of high conductivity light metal, such as aluminium, is mounted in the cylinder 55 for axial movement therealong. The piston 63 has a forwardly and axially extending contact pin 64 aligned with the opening 56 and with the tulip contact 60. The ports 57 are located forwardly of the piston 63, in its rearward position shown in FIG. 4, for venting the cylinder when the piston is propelled forwardly.

Figure 5:
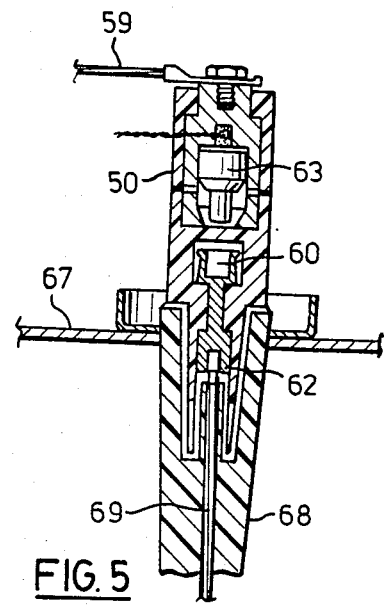
FIG. 5 illustrates the fault current diverter of FIG. 4 mounted on a transformer in a standard bushing well.
Figure 6:
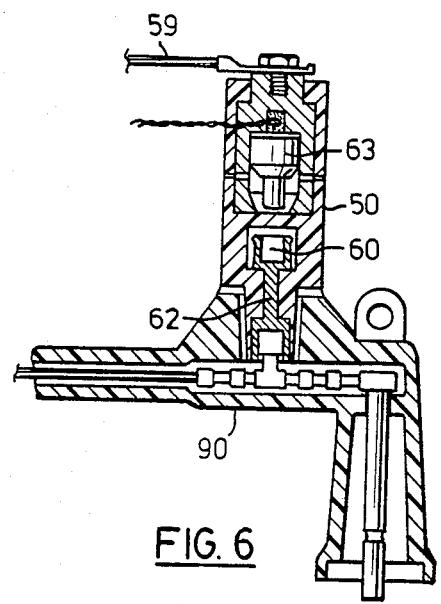
FIG. 6 illustrates the fault current diverter of FIG. 4 used in association with a modified loadbreak elbow.
Figure 7:
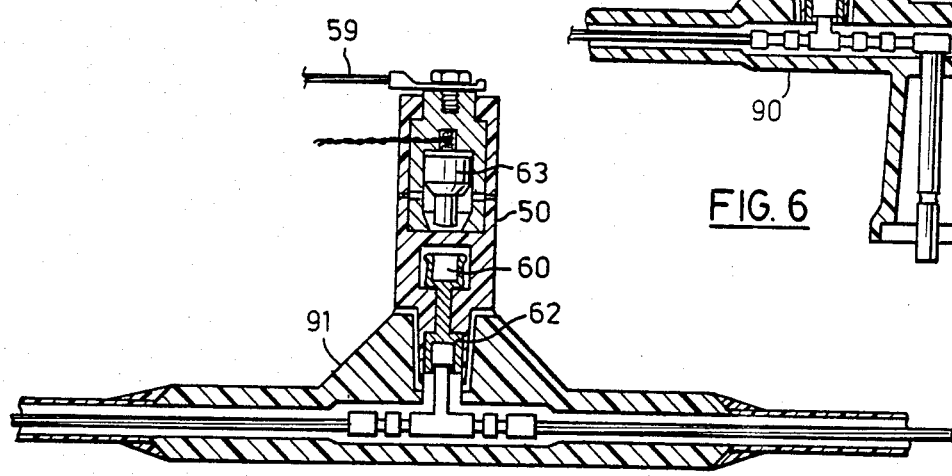
FIG. 7 illustrates the fault current diverter of FIG. 4 used in association with a modified pre-molded cable splice.

The cylinder 55 provides, at its rearward end, a recess in which a chemical propellant capsule 65 is accommodated. This charge will be triggered by a trigger circuit 66, the latter being activated by the detection of a short-circuit fault in the manner shown schematically in FIG. 1. FIG. 5 illustrates, on a reduced scale, the diverter of FIG. 4 mounted on a transformer providing a wall 67 and a conventional bushing well 68 with a terminal conductor 69. FIG. 6 illustrates the diverter mounted for use in association with a modified loadbreak elbow 90. FIG. 7 illustrates the diverter mounted for use in association with a modified pre-molded cable splice 91.

In operation of the device a fault-responsive signal is derived from a current transformer coupled to the equipment, the signal activating the trigger circuit 66 whereby the charge 65 is ignited. This causes the piston 63 to be propelled forwardly, the contact pin 64 piercing the layer of insulating material 54 and rapidly engaging the tulip contact 60. Thus a non-arcing low impedance path is established from the distribution transformer terminal to ground.

One very important feature of a fault current diverter according to the present invention is that it is a stored energy, externally triggerable device. Therefore, it may be used in association with a variety of trigger devices providing different trigger criteria. Such devices may be responsive to electrical system fault parameters, such as system fault current. Alternatively, they may be responsive to indirect manifestations of fault conditions, such as pressure, temperature, smoke, radio frequency noise and other conditions.

Figure 8:
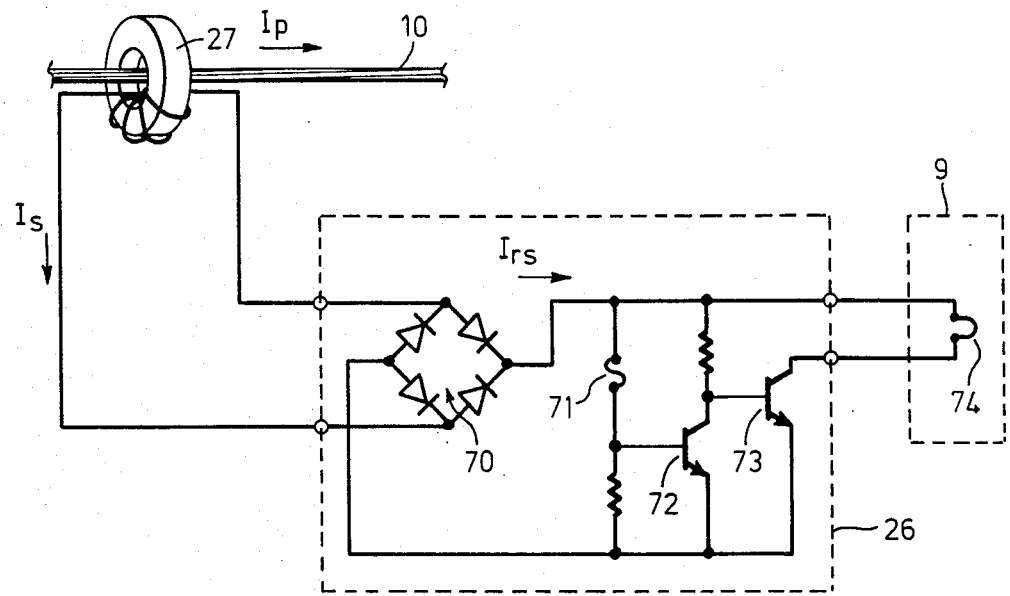
FIG. 8 is a schematic wiring diagram of a trigger circuit in which the trigger criterion is determined by the current/time characteristics of a fuse.

In the arrangement shown in FIG. 8, the trigger device 26 is coupled to the power cable 10 by a small toroidal current transformer 27. The current transformer 27 is used to sense the system current $I_p$, and the secondary current $I_s$ of the transformer is full-wave rectified in a diode bridge 70 at the input to the trigger circuit.

Under normal system operating conditions, the rectified secondary current $I_{rs}$ flows through a small low voltage fuse 71 and the base-emitter junction of a switching transistor 72. The transistor 72 is therefore saturated, and in consequence a second switching transistor 73 is in the open state. No current can flow through the trigger wire 74 of the fault current diverter 9.

Under fault conditions the fuse 71 will blow in accordance with its current/time characteristics.

At the instant at which it blows, the current into the base of the transistor 72 disappears, causing it to open and, as a result, the transistor 73 will saturate. The rectified secondary current $I_{rs}$ is therefore redirected immediately to the trigger wire 74, thereby triggering the fault current diverter 9.

A wide range of current/time trigger characteristics can be achieved by appropriate choices of the fuse 71.

Figure 9:
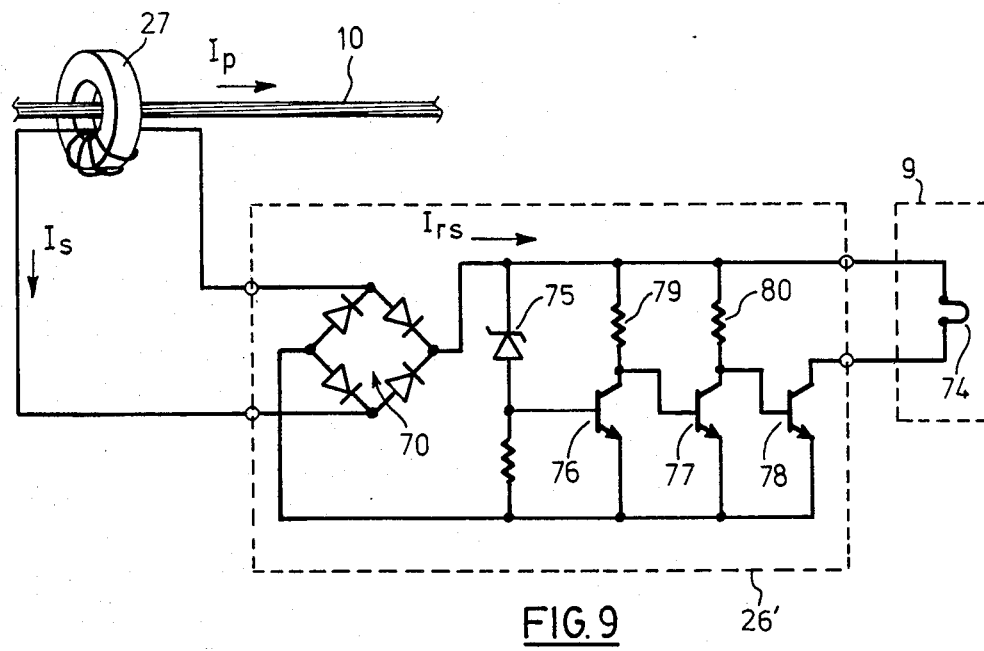
FIG. 9 is a schematic wiring diagram of a trigger circuit which is operable in accordance with the instantaneous value of a fault current.

Referring now to FIG. 9, the trigger circuit 26' allows the fault current diverter 9 to be triggered when the instantaneous fault current magnitude reaches a predetermined value. As in the preceding circuit of FIG. 8, a sensing current transformer 27 and a rectifier bridge 70 are used at the front end of this circuit. Under normal load operation, a Zener diode 75 does not conduct and, therefore, the switching transistors 76,78 are open and transistor 77 is saturated. The current $I_{rs}$ flows only through resistors 79 and 80, but not through the trigger wire 74.

When the instantaneous magnitude of the fault current in cable 10 reaches a predetermined value, so that the corresponding voltage drop developed across resistors 79 and 80, which are essentially in parallel, equals the pre-selected conduction voltage of Zener diode 75, transistor 76 is rapidly driven into saturation. This causes the state of conduction of the other two transistors 77 and 78 to reverse; the trigger wire 74 is energized, and the diverter 9 is triggered. For proper operation, the resistance of the parallel combination of 79 and 80 must be chosen to be equal to the resistance of the trigger wire 74. The instantaneous fault current magnitude at which triggering is to take place is determined by the choice of the conduction voltage of the Zener diode 75.

Figure 10:
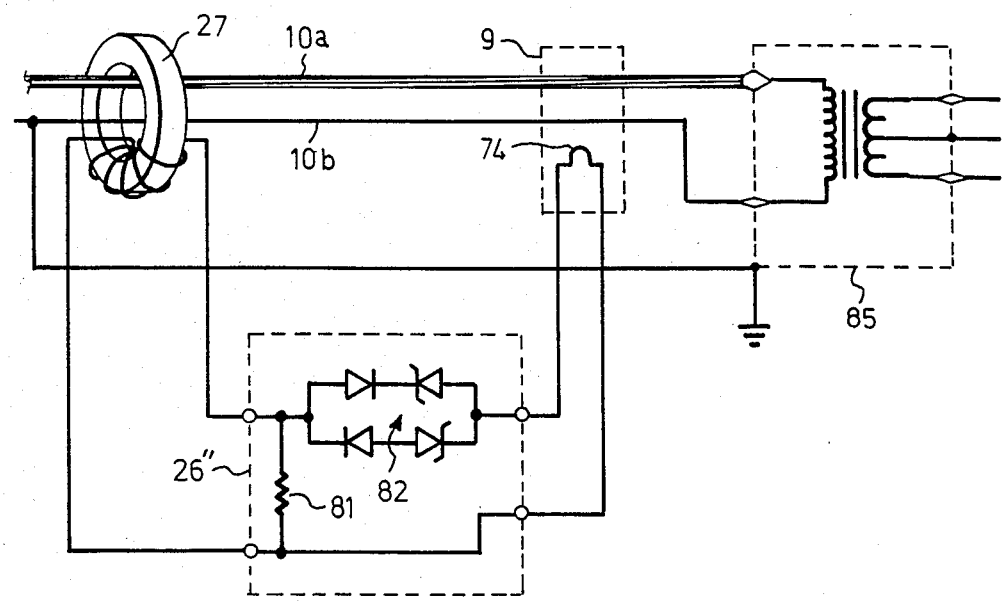
FIG. 10 is a schematic wiring diagram of a trigger circuit which is responsive to a ground fault.

In the system shown in FIG. 10, both the supply cable 10a, the return cable 10b to and from the protected apparatus are passed through the toroidal current transformer 27. The arrangement provides for a very high detection sensitivity of ground faults within the protected apparatus, and at the same time, it is totally independent of the magnitude of either transient or steady-state load currents. It should be noted that for protection of pad-mounted distribution transformers, the low potential end of the primary winding must be brought out from the transformer tank through a low voltage insulating bushing.

With this arrangement under normal operating current transformer conditions, no secondary current ($I_s$) is induced in the current transformer 27, since the net primary current through it is zero. This is true for any primary current magnitude and wave-shape.

In contrast, during ground faults within the protected apparatus 85, the return fault current does not pass through the current transformer. A secondary current is, therefore, induced, and the diverter is triggered.

The combination of the burden resistor 81 and the diode system 82 shown in FIG. 10, is used to ensure that any small continuous secondary current that might be induced under normal operating conditions due to imperfections in the current transformer, would not flow through the trigger wire. The threshold of triggering will be generally quite low (several tens of amperes of primary ground fault current), and it can be adjusted by a proper choice of Zener diodes 82 and the burden resistor 81.

As previously mentioned, the fault current diverters can be triggered with an external sensing device or relay designed to respond to any electrical or non-electrical variable, such as, secondary bus overload or fault condition, pressure, temperature, smoke or noise. Only a conventional small d.c. power supply or a battery is needed to provide the triggering current. An interposed conventional switching relay, either electro-mechanical or solid-state type, might also be required, depending on the nature of the fault sensing device.

Figure 11:
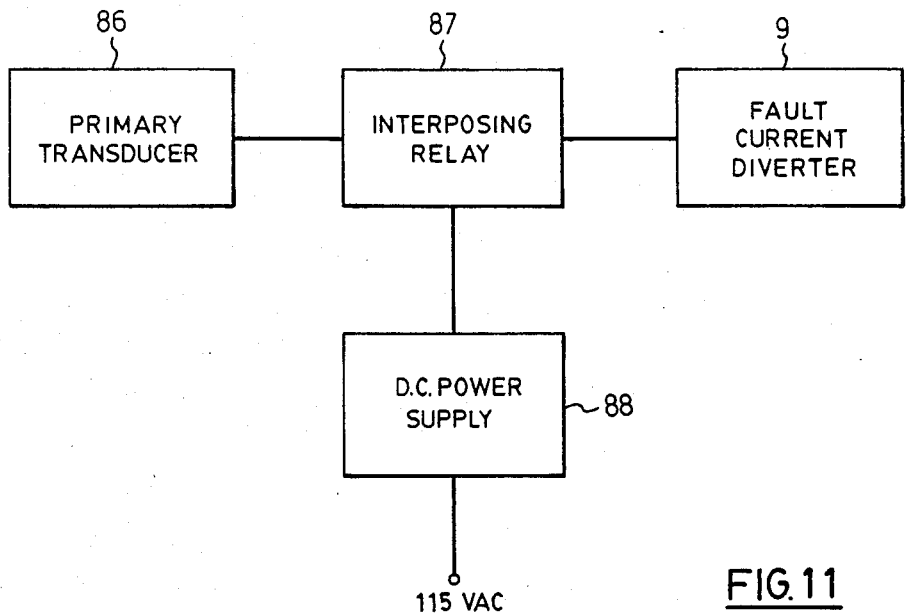
FIG. 11 is a schematic block diagram of a system which is responsive to an external stimulus for triggering a fault current diverter.

An example of the general arrangement of this type is shown in the block diagram of FIG. 11, wherein the fault current diverter 9 is triggered in accordance with a signal from a primary transducer 86, the transducer 86 being of an appropriate type for the condition to be sensed. A relay 87 is interposed between the transducer 86 and diverter 9, the triggering current being derived from a d.c. supply 88 when the relay is operated.

What we claim is:

1. In combination with a high voltage electrical equipment including a high voltage conductor encapsulated in solid insulation, a high speed fault current diverter apparatus comprising:
    a metal body having a forward end and a rearward end, said metal body providing an internal cylindrical first chamber with an opening at its forward end communicating with said first chamber and arranged coaxially therewith,
    conductor means grounding said metal body,
    a metallic piston mounted within said first chamber for axial movement therealong, said piston having a forwardly and axially extending spike aligned with said opening,
    the metal body further providing an internal second chamber rearwardly of the first chamber and communicating therewith rearwardly of the piston,
    a chemical propellant charge in said second chamber,
    means for fastening the metal body to the equipment with said opening adjacent to the solid insulation of the conductor, and
    fault current responsive means igniting the chemical propellant charge so as to propel the piston forwardly, thereby causing the spike to pierce the insulation of the conductor and so establish a non-arcing low impedance current path from the conductor to ground.

2. The combination claimed in claim 1, wherein the second chamber is cylindrical and arranged coaxially with the first chamber and said opening.

3. The combination claimed in claim 1, wherein said fastening means is a clamp adapted to encircle the solid insulation of the conductor, the clamp comprising a first clamping member fixed at the forward end of the body and shaped to receive the solid insulation, a second clamping member, and means for clamping said members in clamping relationship.

4. The combination claimed in claim 1, wherein the fastening means comprises an annular assembly adapted to encircle the insulated conductor and consisting of a first hemicylindrical clamping member formed integrally with the body at the forward end thereof, a second hemicylindrical clamping member hinged at one end to the first clamping member, and adjustable clamping means carried by the second member clamping the insulated conductor into engagement with the first member, said adjustable clamping means being diametrically opposite said opening.

5. The combination claimed in claim 1, wherein said fault current responsive means includes sensing means sensing a condition to be monitored, first circuit means coupled to the sensing means deriving a current signal corresponding to the condition to be monitored, a second circuit means connected to said first circuit means to receive said current signal, said second circuit means including a fusible element adapted to blow in response to a current signal said second circuit means including a fusible element adapted to blow in response to a current signal corresponding to a fault condition, and a transistor switching circuit responsive to blowing of the fusible element diverting the current signal to an ignition device for igniting the charge.

6. The combination claimed in claim 5, wherein the sensing means comprises a current transformer coupled to the high voltage conductor.

7. The combination claimed in claim 1, wherein the fault current responsive means includes sensing means sensing a condition to be monitored, first circuit means coupled to the sensing means deriving a current signal corresponding to the condition to be monitored, second circuit means connected to said first circuit means receiving the current signal, said second circuit means including a Zener diode adapted to become conductive when the current signal corresponds to a fault condition, and a transistor switching circuit responsive to firing of the Zener diode diverting the current signal to an ignition means for igniting the charge.

8. The combination claimed in claim 7, wherein the sensing means comprises a current transformer coupled to the high voltage conductor.

9. The combination claimed in claim 1, said electrical equipment being supplied from a high voltage supply system including a line conductor and a neutral conductor, wherein said fault current responsive means includes a current transformer coupled to said conductors for sensing a fault condition represented by a difference in the currents carried thereby, circuit means coupled to the current transformer deriving a fault current signal corresponding to a fault condition represented by a difference between said currents, and a threshold circuit connected to receive the fault current signal and operable to ignite the charge.

10. A self-contained high speed fault current diverter apparatus for use with high voltage electrical equipment including a high voltage terminal, mounted on a bushing well comprising:
an insulative body having a forward end and a rearward end, the body having a forwardly extending adaptor portion engageable with the bushing well to interface therewith,
said body providing first and second internal, longitudinally aligned chambers separated from one another by a layer of penetrable solid insulation material, the first chamber being positioned rearwardly of the second chamber,
a first conductor located in said first chamber, the first conductor defining a longitudinally extending cylinder having an axial opening at its forward end,
a metallic piston mounted in the cylinder for axial movement therealong, said piston having a forwardly and axially extending pin aligned with said opening,
a second conductor located in said second chamber, said second conductor providing contact means aligned with the pin,
said first and second conductors providing, respectively, first and second external terminals, said second external terminal extending through the adaptor portion and being engageable with the high voltage terminal of the equipment,
conductor means connected to the first external terminal for grounding the first conductor,
a chemical propellant charge located in the cylinder rearwardly of the metallic piston, and
fault current responsive means for igniting the chemical propellant charge so as to propel the piston forwardly, thereby causing the pin to pierce the said layer of penetrable solid insulation and so establish a non-arcing low impedance current path from the high voltage terminal to ground via the first and second conductors and said conductor means.

11. A high speed fault current diverter apparatus according to claim 10 wherein the first and second chambers are coaxially arranged cylindrical cavities.

12. A high speed fault current diverter apparatus according to claim 11, wherein said longitudinally extending cylinder provides lateral ports forwardly of the piston for venting the cylinder as the piston is propelled.

13. A high speed fault current diverter apparatus according to claim 12, wherein the piston is of high conductivity light metal.

14. A high speed fault current diverter apparatus according to claim 13, wherein the piston is of aluminium.

15. A high speed fault current diverter apparatus according to claim 10, wherein said fault current responsive means includes sensing means for sensing a condition to be monitored, first circuit means coupled to the sensing means deriving a current signal corresponding to said condition, second circuit means connected to said first circuit means to receive said current signal, said second circuit means including a fusible element to blow in response to a current signal corresponding to a fault condition, and a transistor switching circuit responsive to blowing of the fusible element diverting the current signal to an ignition device for igniting the charge.

16. A high speed fault current diverter apparatus according to claim 15, wherein the sensing means comprises a current transformer coupled to the high voltage conductor.

17. A high speed fault current diverter apparatus according to claim 10, wherein the fault current responsive means includes sensing means for sensing a condition to be monitored, first circuit means coupled to the sensing means deriving a current signal corresponding to said condition, second circuit means connected to said first circuit means for receiving the current signal, said second circuit means including a Zener diode to become conductive when the current signal corresponds to a fault condition, and a transistor switching circuit responsive to firing of the Zener diode diverting the current signal to an ignition means for igniting the charge.

18. A high speed fault current diverter according to claim 17, wherein the sensing means comprises a current transformer coupled to the high voltage conductor.

19. A high speed fault current diverter apparatus according to claim 10, for use in association with a high voltage supply system including a line conductor and a neutral conductor, wherein said fault current responsive means includes a current transformer coupled to said conductors sensing a fault condition represented by a difference in the currents carried thereby, circuit means coupled to the current transformer deriving a fault current signal corresponding to a fault condition represented by a difference between said currents, and a threshold circuit connected to receive the fault current signal and operable to ignite the charge.

* * * * *